(12) United States Patent
Garg et al.

(10) Patent No.: US 8,085,696 B2
(45) Date of Patent: Dec. 27, 2011

(54) DYNAMIC MODIFICATION OF ROUTE UPDATE PROTOCOLS

(75) Inventors: Deepak Garg, Nashua, NH (US); Prasasth R. Palnati, Westford, MA (US); Prince Samar, Lexington, MA (US)

(73) Assignee: Airvana Networks Solutions, Inc., Chelmsford, MA (US)

( * ) Notice: Subject to any disclaimer, the term of this patent is extended or adjusted under 35 U.S.C. 154(b) by 954 days.

(21) Appl. No.: 11/486,545

(22) Filed: Jul. 14, 2006

(65) Prior Publication Data
US 2008/0013488 A1    Jan. 17, 2008

(51) Int. Cl.
*H04B 7/00* (2006.01)
(52) U.S. Cl. .................................................. 370/310
(58) Field of Classification Search .................. 370/310, 370/330–335, 349, 464–467, 480–487; 455/422, 455/436, 442
See application file for complete search history.

(56) References Cited

U.S. PATENT DOCUMENTS

| | | |
|---|---|---|
| 5,128,938 A | 7/1992 | Borras |
| 5,239,675 A | 8/1993 | Dudczak |
| 5,377,224 A | 12/1994 | Hudson |
| 5,574,996 A | 11/1996 | Raith |
| 5,754,945 A | 5/1998 | Lin et al. |
| 5,790,528 A | 8/1998 | Muszynski |
| 5,815,813 A | 9/1998 | Faruque |
| 5,828,661 A | 10/1998 | Weaver et al. |
| 5,852,630 A | 12/1998 | Langberg et al. |
| 5,857,154 A | 1/1999 | Laborde et al. |
| 5,884,177 A | 3/1999 | Hanley |
| 5,930,714 A | 7/1999 | Abu-Amara et al. |
| 5,937,345 A | 8/1999 | McGowan et al. |
| 5,940,762 A | 8/1999 | Lee et al. |
| 5,960,349 A | 9/1999 | Chheda |
| 5,974,318 A | 10/1999 | Satarasinghe |
| 5,983,282 A | 11/1999 | Yucebay |
| 5,991,635 A | 11/1999 | Dent et al. |
| 6,011,970 A | 1/2000 | McCarthy |
| 6,014,564 A | 1/2000 | Donis et al. |
| 6,016,429 A | 1/2000 | Khafizov et al. |
| 6,023,625 A | 2/2000 | Myers |
| 6,032,033 A | 2/2000 | Morris et al. |
| 6,047,186 A | 4/2000 | Yu et al. |
| 6,049,715 A | 4/2000 | Willhoff et al. |
| 6,052,594 A | 4/2000 | Chuang et al. |
| 6,061,560 A | 5/2000 | Saboorian et al. |
| 6,069,871 A | 5/2000 | Sharma et al. |
| 6,091,953 A | 7/2000 | Ho et al. |

(Continued)

FOREIGN PATENT DOCUMENTS
AU    1998/72855    12/1998
(Continued)

OTHER PUBLICATIONS

Cdma2000 High Rate Packet Data Air Interface Specification, S0024-A, 3GPP2. version 1, Mar. 2004, pp. 1-1083.*

(Continued)

*Primary Examiner* — Dmitry H Levitan
(74) *Attorney, Agent, or Firm* — Fish & Richardson P.C.

(57) ABSTRACT

A radio access network dynamically modifies a route update protocol of an access terminal in an active state that is in communication with the network, such that the access terminal reports a route update message upon satisfaction of a condition. The condition may be related to an inter-revision hard handoff, an inter-frequency hard handoff, a RF dragging prevention, a selective resource allocation, or some combination thereof.

36 Claims, 3 Drawing Sheets

U.S. PATENT DOCUMENTS

| | | | |
|---|---|---|---|
| 6,101,394 A | 8/2000 | Illidge | |
| 6,111,857 A | 8/2000 | Soliman et al. | |
| 6,112,089 A | 8/2000 | Satarasinghe | |
| 6,119,024 A | 9/2000 | Takayama | |
| 6,122,513 A | 9/2000 | Bassirat | |
| 6,151,512 A | 11/2000 | Chheda et al. | |
| 6,167,036 A | 12/2000 | Beven | |
| 6,178,328 B1 | 1/2001 | Tang et al. | |
| 6,192,246 B1 | 2/2001 | Satarasinghe | |
| 6,198,719 B1 | 3/2001 | Faruque et al. | |
| 6,198,910 B1 | 3/2001 | Hanley | |
| 6,208,615 B1 | 3/2001 | Faruque et al. | |
| 6,219,539 B1 | 4/2001 | Basu et al. | |
| 6,223,047 B1 | 4/2001 | Ericsson | |
| 6,233,247 B1 | 5/2001 | Alami et al. | |
| 6,252,862 B1 | 6/2001 | Sauer et al. | |
| 6,256,300 B1 | 7/2001 | Ahmed et al. | |
| 6,266,529 B1 | 7/2001 | Chheda | |
| 6,272,148 B1 | 8/2001 | Takagi et al. | |
| 6,285,875 B1 | 9/2001 | Alajoki et al. | |
| 6,289,220 B1 | 9/2001 | Spear | |
| 6,320,898 B1 | 11/2001 | Newson et al. | |
| 6,345,185 B1 | 2/2002 | Yoon et al. | |
| 6,366,961 B1 | 4/2002 | Subbiah et al. | |
| 6,370,357 B1 | 4/2002 | Xiao et al. | |
| 6,370,381 B1 | 4/2002 | Minnick et al. | |
| 6,393,482 B1 | 5/2002 | Rai et al. | |
| 6,400,712 B1 | 6/2002 | Phillips | |
| 6,404,754 B1 | 6/2002 | Lim | |
| 6,408,182 B1 | 6/2002 | Davidson et al. | |
| 6,418,306 B1 | 7/2002 | McConnell | |
| 6,424,834 B1 | 7/2002 | Chang et al. | |
| 6,430,168 B1 | 8/2002 | Djurkovic et al. | |
| 6,438,376 B1 | 8/2002 | Elliott et al. | |
| 6,438,377 B1 | 8/2002 | Savolainen | |
| 6,445,922 B1 | 9/2002 | Hiller et al. | |
| 6,459,696 B1 | 10/2002 | Carpenter et al. | |
| 6,473,399 B1 | 10/2002 | Johansson et al. | |
| 6,477,159 B1 | 11/2002 | Yahagi | |
| 6,480,476 B1 | 11/2002 | Willars | |
| 6,480,718 B1 | 11/2002 | Tse | |
| 6,507,741 B1 | 1/2003 | Bassirat | |
| 6,522,885 B1 | 2/2003 | Tang et al. | |
| 6,539,030 B1 | 3/2003 | Bender et al. | |
| 6,542,481 B2 | 4/2003 | Foore et al. | |
| 6,542,752 B1 | 4/2003 | Illidge | |
| 6,545,984 B1 | 4/2003 | Simmons | |
| 6,560,453 B1 | 5/2003 | Henry et al. | |
| 6,580,699 B1 | 6/2003 | Manning et al. | |
| 6,590,879 B1 | 7/2003 | Huang et al. | |
| 6,611,695 B1 | 8/2003 | Periyalwar | |
| 6,618,585 B1 | 9/2003 | Robinson et al. | |
| 6,621,811 B1 | 9/2003 | Chang et al. | |
| 6,628,637 B1 | 9/2003 | Li et al. | |
| 6,651,105 B1 | 11/2003 | Bhagwat et al. | |
| 6,687,237 B1 | 2/2004 | Lee et al. | |
| 6,701,148 B1 | 3/2004 | Carter et al. | |
| 6,701,149 B1 | 3/2004 | Bagchi et al. | |
| 6,711,144 B1 | 3/2004 | Kim et al. | |
| 6,731,618 B1 | 5/2004 | Chung et al. | |
| 6,738,625 B1 | 5/2004 | Oom et al. | |
| 6,741,862 B2 | 5/2004 | Chung et al. | |
| 6,754,191 B1 | 6/2004 | Paranchych et al. | |
| 6,757,319 B1 | 6/2004 | Parsa et al. | |
| 6,768,903 B2 | 7/2004 | Fauconnier et al. | |
| 6,771,962 B2 | 8/2004 | Saifullah et al. | |
| 6,781,999 B2 | 8/2004 | Eyuboglu et al. | |
| 6,813,498 B1 | 11/2004 | Durga et al. | |
| 6,826,402 B1 | 11/2004 | Tran | |
| 6,834,050 B1 | 12/2004 | Madour et al. | |
| 6,842,630 B2 | 1/2005 | Periyalwar | |
| 6,847,821 B1 | 1/2005 | Lewis et al. | |
| 6,877,104 B1 | 4/2005 | Shimono | |
| 6,909,887 B2 | 6/2005 | Fauconnier et al. | |
| 6,944,452 B2 | 9/2005 | Coskun et al. | |
| 6,975,869 B1 | 12/2005 | Billon | |
| 6,996,056 B2 | 2/2006 | Chheda et al. | |
| 6,999,784 B1 | 2/2006 | Choi et al. | |
| 7,035,636 B1 | 4/2006 | Lim et al. | |
| 7,042,858 B1 | 5/2006 | Jia et al. | |
| 7,047,009 B2 * | 5/2006 | Laroia et al. | 455/437 |
| 7,072,663 B2 | 7/2006 | Ramos et al. | |
| 7,079,511 B2 | 7/2006 | Abrol et al. | |
| 7,085,251 B2 * | 8/2006 | Rezaiifar | 370/331 |
| 7,110,785 B1 | 9/2006 | Paranchych et al. | |
| 7,130,626 B2 | 10/2006 | Bender et al. | |
| 7,130,668 B2 | 10/2006 | Chang et al. | |
| 7,139,575 B1 | 11/2006 | Chen et al. | |
| 7,162,247 B2 | 1/2007 | Baba et al. | |
| 7,170,871 B2 | 1/2007 | Eyuboglu et al. | |
| 7,177,650 B1 | 2/2007 | Reiger et al. | |
| 7,200,391 B2 | 4/2007 | Chung et al. | |
| 7,212,822 B1 | 5/2007 | Vicharelli | |
| 7,236,764 B2 | 6/2007 | Zhang et al. | |
| 7,242,958 B2 | 7/2007 | Chung et al. | |
| 7,251,491 B2 | 7/2007 | Jha | |
| 7,277,446 B1 | 10/2007 | Abi-Nassif et al. | |
| 7,298,327 B2 | 11/2007 | Dupray et al. | |
| 7,299,168 B2 | 11/2007 | Rappaport et al. | |
| 7,299,278 B2 | 11/2007 | Ch'ng | |
| 7,349,699 B1 | 3/2008 | Kelly et al. | |
| 7,398,087 B1 | 7/2008 | McConnell et al. | |
| 7,408,887 B2 | 8/2008 | Sengupta et al. | |
| 7,408,901 B1 | 8/2008 | Narayanabhatla | |
| 7,411,996 B2 | 8/2008 | Kim et al. | |
| 7,453,912 B2 * | 11/2008 | Laroia et al. | 370/526 |
| 7,457,265 B2 * | 11/2008 | Julka et al. | 370/331 |
| 7,486,696 B2 | 2/2009 | Garg et al. | |
| 7,512,110 B2 * | 3/2009 | Sayeedi et al. | 370/349 |
| 7,546,124 B1 * | 6/2009 | Tenneti et al. | 455/436 |
| 7,558,356 B2 | 7/2009 | Pollman et al. | |
| 7,558,588 B2 | 7/2009 | To et al. | |
| 7,751,835 B2 | 7/2010 | Sharma et al. | |
| 7,751,858 B2 | 7/2010 | Chou | |
| 2002/0025820 A1 | 2/2002 | Fauconnier et al. | |
| 2002/0031107 A1 | 3/2002 | Li et al. | |
| 2002/0032034 A1 | 3/2002 | Tiedemann et al. | |
| 2002/0035699 A1 | 3/2002 | Crosbie | |
| 2002/0067707 A1 | 6/2002 | Morales et al. | |
| 2002/0068570 A1 | 6/2002 | Abrol et al. | |
| 2002/0082018 A1 | 6/2002 | Coskun | |
| 2002/0085719 A1 | 7/2002 | Crosbie | |
| 2002/0102976 A1 | 8/2002 | Newbury et al. | |
| 2002/0104399 A1 | 8/2002 | Wilson et al. | |
| 2002/0136226 A1 | 9/2002 | Christoffel et al. | |
| 2002/0145990 A1 | 10/2002 | Sayeedi | |
| 2002/0193110 A1 | 12/2002 | Julka et al. | |
| 2002/0196749 A1 | 12/2002 | Eyuboglu et al. | |
| 2003/0003913 A1 | 1/2003 | Chen et al. | |
| 2003/0026240 A1 | 2/2003 | Eyuboglu et al. | |
| 2003/0031201 A1 | 2/2003 | Choi | |
| 2003/0067970 A1 | 4/2003 | Kim et al. | |
| 2003/0095513 A1 | 5/2003 | Woodmansee et al. | |
| 2003/0100311 A1 | 5/2003 | Chung et al. | |
| 2003/0114162 A1 | 6/2003 | Chheda et al. | |
| 2003/0117948 A1 | 6/2003 | Ton et al. | |
| 2003/0125039 A1 | 7/2003 | Lachtar et al. | |
| 2003/0195016 A1 | 10/2003 | Periyalwar | |
| 2004/0008649 A1 | 1/2004 | Wybenga et al. | |
| 2004/0015607 A1 | 1/2004 | Bender et al. | |
| 2004/0038700 A1 | 2/2004 | Gibbs | |
| 2004/0068668 A1 | 4/2004 | Lor et al. | |
| 2004/0081111 A1 | 4/2004 | Bae et al. | |
| 2004/0179492 A1 | 9/2004 | Zhang et al. | |
| 2004/0203771 A1 | 10/2004 | Chang et al. | |
| 2004/0214574 A1 | 10/2004 | Eyuboglu et al. | |
| 2004/0218556 A1 | 11/2004 | Son et al. | |
| 2004/0224687 A1 | 11/2004 | Rajkotia | |
| 2005/0021616 A1 | 1/2005 | Rajahalm et al. | |
| 2005/0025116 A1 | 2/2005 | Chen et al. | |
| 2005/0053034 A1 | 3/2005 | Chiueh | |
| 2005/0111429 A1 * | 5/2005 | Kim et al. | 370/344 |
| 2005/0113117 A1 | 5/2005 | Bolin et al. | |
| 2005/0124343 A1 | 6/2005 | Kubo | |
| 2005/0148297 A1 | 7/2005 | Lu et al. | |
| 2005/0181795 A1 | 8/2005 | Mark et al. | |
| 2005/0207368 A1 | 9/2005 | Nam | |

| | | |
|---|---|---|
| 2005/0213555 A1 | 9/2005 | Eyuboglu et al. |
| 2005/0233746 A1 | 10/2005 | Laroia et al. |
| 2005/0243749 A1 | 11/2005 | Mehrabanzad et al. |
| 2005/0245279 A1 | 11/2005 | Mehrabanzad et al. |
| 2006/0030323 A1 | 2/2006 | Ode et al. |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0126554 A1 | 6/2006 | Motegi et al. |
| 2006/0126556 A1 | 6/2006 | Jiang et al. |
| 2006/0148460 A1 | 7/2006 | Mukherjee et al. |
| 2006/0159045 A1 | 7/2006 | Ananthaiyer et al. |
| 2006/0182063 A1 | 8/2006 | Jia et al. |
| 2006/0183497 A1 | 8/2006 | Paranchych et al. |
| 2006/0203766 A1 | 9/2006 | Kim et al. |
| 2006/0209760 A1 | 9/2006 | Saito et al. |
| 2006/0209882 A1 | 9/2006 | Han et al. |
| 2006/0240782 A1 | 10/2006 | Pollman et al. |
| 2006/0259628 A1 | 11/2006 | Vadlapudi et al. |
| 2006/0264218 A1 | 11/2006 | Zhang et al. |
| 2006/0291420 A1 | 12/2006 | Ng |
| 2006/0294214 A1 | 12/2006 | Chou |
| 2006/0294241 A1 | 12/2006 | Cherian et al. |
| 2007/0022396 A1 | 1/2007 | Attar et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0099632 A1 | 5/2007 | Choksi |
| 2007/0105527 A1 | 5/2007 | Nylander |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0153750 A1 | 7/2007 | Baglin et al. |
| 2007/0155329 A1 | 7/2007 | Mehrabanzad et al. |
| 2007/0160008 A1 | 7/2007 | Burgess |
| 2007/0197220 A1 | 8/2007 | Willey |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0009328 A1 | 1/2008 | Narasimha |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0070574 A1 | 3/2008 | Vikberg et al. |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2008/0273493 A1 | 11/2008 | Fong et al. |
| 2008/0287130 A1 | 11/2008 | Laroia et al. |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0103494 A1 | 4/2009 | Jia et al. |
| 2009/0116445 A1 | 5/2009 | Samar et al. |
| 2009/0129334 A1 | 5/2009 | Fong et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'Ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0186626 A1 | 7/2009 | Raghothaman et al. |

FOREIGN PATENT DOCUMENTS

| | | |
|---|---|---|
| AU | 1998/84574 | 2/1999 |
| AU | 2001/21976 | 6/2001 |
| AU | 735575 | 7/2001 |
| AU | 2003/202721 | 10/2003 |
| CA | 2295922 | 3/2004 |
| CN | 1265253 | 8/2000 |
| CN | 1653844 | 10/2004 |
| CN | 101015224 A | 8/2007 |
| EP | 625863 | 11/1994 |
| EP | 0904369 | 3/1999 |
| EP | 983694 | 3/2000 |
| EP | 983705 | 3/2000 |
| EP | 995278 | 4/2000 |
| EP | 995296 | 4/2000 |
| EP | 1005245 | 5/2000 |
| EP | 1011283 | 6/2000 |
| EP | 1014107 | 6/2000 |
| EP | 1397929 | 3/2004 |
| EP | 1491065 | 12/2004 |
| EP | 1751998 | 2/2007 |
| EP | 1896980 | 3/2008 |
| EP | 1897383 | 3/2008 |
| GB | 2447585 | 8/2008 |
| GB | 2452688 | 3/2009 |
| HK | 1101334 A | 10/2007 |
| JP | 2007-538476 | 12/2007 |
| JP | 2008-547329 | 12/2008 |
| JP | 2008-547358 | 12/2008 |
| KR | 9833373 | 8/1998 |
| KR | 2004/046069 | 6/2004 |
| KR | 2004/089744 | 10/2004 |
| KR | 787289 | 12/2007 |
| MX | 1999/10613 | 3/2002 |
| WO | WO9748191 | 12/1997 |
| WO | WO 98/08353 | 2/1998 |
| WO | WO 98/09460 | 3/1998 |
| WO | WO98/53618 | 11/1998 |
| WO | WO98/53620 | 11/1998 |
| WO | WO99/03245 | 1/1999 |
| WO | WO99/04511 | 1/1999 |
| WO | WO00/60891 | 10/2000 |
| WO | WO01/45308 | 6/2001 |
| WO | WO02/071633 | 9/2002 |
| WO | WO02/071652 | 9/2002 |
| WO | WO03/001820 | 1/2003 |
| WO | WO03/009576 | 1/2003 |
| WO | WO03/081938 | 10/2003 |
| WO | WO2004/064434 | 7/2004 |
| WO | WO2005/012520 | 12/2005 |
| WO | WO2005/115026 | 12/2005 |
| WO | WO2006/081527 | 8/2006 |
| WO | WO 2007/002659 | 1/2007 |
| WO | WO2007/028122 | 3/2007 |
| WO | WO2007/028252 | 3/2007 |
| WO | WO 2007/044099 | 4/2007 |
| WO | WO2007/045101 | 4/2007 |
| WO | WO 2007/075446 | 7/2007 |
| WO | WO 2007/078766 | 7/2007 |
| WO | WO2007/078766 | 5/2011 |

OTHER PUBLICATIONS

Paul Bender, et al., "CDMA/HDR: A Bandwidth-Efficient High-Speed Wireless Data Service for Nomadic Users", IEEE Communications Magazine, Jul. 2000.

Paul Bender & Ramin Rezalifar, "Draft Baseline Text for the 1xEV-DO Upper Layers (excluding Physical Layer)", 3GPP2, Aug. 17, 2000.
3GPP2, "3GPP2 Access Network Interfaces Interoperability Specification 2, Release A," Jun. 2000.
TIA/EIA/TSB-115, "Wireless IP Architecture Based on IETF Protocols", Jun. 6, 2000.
3GPP2, "Wireless IP Network Standard", 3rd Generation Partnership Project 2 (3GPP2), Version 1.0.0, Jul. 14, 2000.
3rd Generation Partnership Project 2 "3GPP2", "cdma2000 High Rate Packet Data Interface Specification", C.S0024, version 2, Oct. 27, 2000 (441 pages).
3rd Generation Partnership Project 2 "3GPP2", "cdma2000 High Rate Packet Data Interface Specification", C.S0024-A, version 2, Jul. 2005 (1227 pages).
3rd Generation Partnership Project 2 "3GPP2", "cdma2000 High Rate Packet Data Interface Specification", C.S0024-B, version 1, Apr. 2006 (1623 pages).
3rd Generation Partnership Project 2 "3GPP2", "cdma2000 High Rate Packet Data Interface Specification", C.S0024-B, version 2, Mar. 2007 (1627 pages).
3rd Generation Partnership Project 2 "3GPP2", "cdma2000 High Rate Packet Data Interface Specification", C.S0024, version 4, Oct. 25, 2002 (548 pages).
International Search Report and Written Opinion for PCT international application No. PCT/US2006/024958, mailed Apr. 26, 2007 (12 pages).
International Search Report and Written Opinion for PCT international application No. PCT/US2005/017385, mailed Oct. 26, 2006 (22 pages).
International Search Report for PCT international application No. PCT/US2002/020380, mailed Oct. 29, 2002 (5 pages).
International Search Report and Written Opinion for PCT international application No. PCT/US2006/25018, mailed Jan. 29, 2008 (11 pages).
International Preliminary Report on Patentability for Application No. PCT/US2006/25018, Mar. 19, 2009 (8 pages).
International Preliminary Report on Patentability for Application No. PCT/US2005/017385, Dec. 7, 2006 (8 pages).
International Preliminary Report on Patentability for Application No. PCT/US2006/024958, Jan. 17, 2008 (7 pages).
EP Examination Report for Application No. 06785637.7, Feb. 6, 2008 (2 pages).
Australian (AU) Examination Report for Application No. 2005426813, Jun. 4, 2009 (18 pages).
International Preliminary Report on Patentability for PCT international application No. PCT/US2006/047963, mailed Dec. 11, 2008 (5 pages).
International Search Report and Written Opinion for PCT international application No. PCT/US2006/047963, mailed Sep. 26, 2008 (9 pages).
International Search Report and Written Opinion for PCT international application No. PCT/US2006/047524, mailed May 26, 2009 (13 pages).
U.S. Appl. No. 09/891,103, filed Jun. 25, 2001, and pending claims.
PCT application No. PCT/US2002/020380 filed on Jun. 25, 2002, with Publication No. WO2003/001820.
U.S. Appl. No. 11/640,619, filed Dec. 18, 2006 and pending claims.
PCT application No. PCT/US2005/17385 filed on May 17, 2005, with Publication No. WO2005/115026.
U.S. Appl. No. 11/166,893, filed Jun. 24, 2005, and pending claims.
PCT application No. PCT/US2006/025018 filed on Jun. 26, 2006, with Publication No. WO2007/044099.
U.S. Appl. No. 11/037,896, filed Jan. 18, 2005, and pending claims.
U.S. Appl. No. 11/167,785, filed Jun. 27, 2005, and pending claims.
PCT application No. PCT/US2006/24958 filed on Jun. 27, 2006, with Publication No. WO2007/002659.
U.S. Appl. No. 11/243,405, filed Oct. 4, 2005, and pending claims.
U.S. Appl. No. 11/303,773, filed Dec. 16, 2005, and pending claims.
U.S. Appl. No. 11/305,286, filed Dec. 16, 2005, and pending claims.
PCT application No. PCT/US2006/47524 filed on Dec. 13, 2006, with Publication No. WO2007/078766.
U.S. Appl. No. 11/303,774, filed Dec. 16, 2005, and pending claims.
PCT application No. PCT/US2006/47963 filed on Dec. 15, 2006, with Publication No. WO2007/075446.
U.S. Appl. No. 11/402,744, filed Apr. 12, 2006, and pending claims.
U.S. Appl. No. 11/955,644, filed on Dec. 13, 2007, and pending claims.
Goran Janevski, "IP-Based Mobile Wireless Access Network Architecture", Nortel Networks-MWIF Contribution, Draft dated Sep. 7, 2000.
3rd Generation Partnership Project "3GPP2", cdma2000 High Rate Packet Data Interface Specification, C.S0024-A, version 1.0, Mar. 2004.
Rashid Attar et al., "Evolution of cdma2000 Cellular Networks: Multicarrier EV-DO", IEEE Communications Magazine, Mar. 2006. pp. 46-53.
Chinese Office action of Chinese application No. 200580024230.0 mailed Mar. 15, 2009 (13 pages).
EP Examination Report for Application No. 05750705.5, Jan. 9, 2007 (2 pages).
Office Action and response from European Patent Office for Application No. 06836082.5 mailed Jun. 18, 2009 and sent Jul. 21, 2009 (21 pages).
Chinese Office action response of Chinese application No. 200580024230.0 sent Jul. 22, 2009 (8 pages).
TIA/EIA/IS-2001, Interoperability Specification (IOS) for CDMA2000 Network Access Interfaces, Aug. 2001 (revised version of May 2000).
Office action and response history of U.S. Appl. No. 10/848,597 to May 18, 2004.
Office action and response history of U.S. Appl. No. 11/037,896 to May 27, 2009.
Office action of U.S. Appl. No. 11/303,774 dated Jun. 12, 2009.
Office action and response history of U.S. Appl. No. 11/166,893 to Aug. 11, 2009.
Office action and response history of U.S. Appl. No. 11/955,644 to Aug. 11, 2009.
Office action and response history of U.S. Appl. No. 09/891,103 to Aug. 11, 2009.
Office action and response history of U.S. Appl. No. 11/167,785 to Aug. 11, 2009.
Office action and response history of U.S. Appl. No. 11/243,405 to Aug. 11, 2009.
Office action and response history of U.S. Appl. No. 11/305,286 to Aug. 11, 2008.
Office Action and response history of U.S. Appl. No. 11/303,774 to Aug. 11, 2009.
Office action and response history of U.S. Appl. No. 11/303,773 to Aug. 13, 2009.
Office action and response history of U.S. Appl. No. 11/402,744 to Aug. 17, 2009.
Library Search of Patent Assignee/Inventor Search for "Nortel" conducted on Aug. 28, 2009 (85 pages).
Library Search for Nortel and frequency handoff. Search results dated Aug. 28, 2009 (85 pages).
Office action and response history of U.S. Appl. No. 11/037,896 to Sep. 17, 2009.
Office action and response history of U.S. Appl. No. 11/303,774 to Sep. 17, 2009.
Office action and response history of U.S. Appl. No. 11/167,785 to Sep. 22, 2009.
Office action and response history of U.S. Appl. No. 11/243,405 to Nov. 9, 2009.
Office action and response history of U.S. Appl. No. 11/305,286 to Sep. 30, 2009.
Office action and response history of U.S. Appl. No. 11/640,619 to Nov. 9, 2009.
Office action and response history of U.S. Appl. No. 09/891,103 to Nov. 10, 2009.
Office action and response history of U.S. Appl. No. 11/303,773 to Nov. 20, 2009.
Office action and response history of U.S. Appl. No. 11/402,744 to Nov. 30, 2009.
Chinese Office action of Chinese application No. 200580024230.0 mailed Nov. 20, 2009 (4 pages).
Office action and response history of U.S. Appl. No. 11/166,893 to Dec. 8, 2009.
Office action and response history of U.S. Appl. No. 09/891,103 to Dec. 8, 2009.
Office action and response history of U.S. Appl. No. 11/037,896 to Dec. 8, 2009.

Office action and response history of U.S. Appl. No. 11/243,405 to Dec. 8, 2009.
Office action and response history of U.S. Appl. No. 11/955,644 to Dec. 8, 2009.
Office action and response history of U.S. Appl. No. 11/303,774 to Dec. 11, 2009.
Office action and response history of U.S. Appl. No. 11/243,405 to Jan. 6, 2010.
Office action and response history of U.S. Appl. No. 11/037,896 to Jan. 11, 2010.
Office action and response history of U.S. Appl. No. 11/305,286 to Jan. 11, 2010.
Office action and response history of U.S. Appl. No. 11/167,785 to Jan. 11, 2010.
Office action and response history of U.S. Appl. No. 09/891,103 to Dec. 13, 2009.
GB Examination Report for Application No. 0811839.0, mailed Jan. 22, 2010 (2 pages).
Chinese Office action Chinese application No. 200580024230.0 sent Nov. 20, 2009 with English translation (6 pages).
Chinese Office action response of Chinese application No. 200580024230.0 filed Feb. 5, 2010, along with instructions for response and associate recommendation (12 pages).
Office action and response history of U.S. Appl. No. 11/037,896 to Feb. 27, 2010.
European Patent Office communication and response of European application No. 06836082.5 mailed Jun. 18, 2009 (21 pages).
Office action and response history of U.S. Appl. No. 11/640,619 to Mar. 2, 2010.
Office action and response history of U.S. Appl. No. 11/303,774 to Mar. 10, 2010.
Office action and response history of U.S. Appl. No. 11/303,773 to Mar. 11, 2010.
Office action and response history of U.S. Appl. No. 11/166,893 to Mar. 25, 2010.
Office action and response history of U.S. Appl. No. 11/402,744 to Mar. 30, 2010.
Office action and response history of U.S. Appl. No. 11/167,785 to Apr. 28, 2010.
Office action and response history of U.S. Appl. No. 11/305,286 to Mar. 30, 2010.
Office action and response history of U.S. Appl. No. 09/891,103 to May 24, 2010.
Office action and response history of U.S. Appl. No. 11/955,644 to May 13, 2010.
Office action and response history of U.S. Appl. No. 11/243,405 to Apr. 13, 2010.
Chinese Office action with English translation of Chinese application No. 200580024230.0 dated May 17, 2010 (6 pages).
Response filed May 21, 2010 to GB Examination Report for Application No. 0811839.0, dated Jan. 22, 2010 (12 pages).
GB Examination Report for Application No. 0811839.0, mailed Jun. 3, 2010 (3 pages).
Office action and response history of U.S. Appl. No. 11/303,773 to Jun. 11, 2010.
Office action and response history of U.S. Appl. No. 11/037,896 to Jun. 16, 2010.
Office action and response history of U.S. Appl. No. 11/243,405 to Jun. 17, 2010.
Office action and response history of U.S. Appl. No. 11/640,619 to Jun. 18, 2010.
Office action and response history of U.S. Appl. No. 11/166,893 to Apr. 13, 2010.
Office action and response history of U.S. Appl. No. 09/891,103 to Jun. 14, 2010.
Office action and response history of U.S. Appl. No. 11/303,774 to Jun. 10, 2010.
Office action and response history of U.S. Appl. No. 11/955,644 to Jun. 3, 2010.
Fish & Richardson, P.C., Amendment in reply to Action dated Jun. 16, 2010 in U.S. Appl. No. 11/037,896, dated Jun. 28, 2010, 21 pages.
USPTO Advisory Action in U.S. Appl. No. 11/303,774, dated Jun. 30, 2010, 4 pages.
Examiner Interview Summary in U.S. Appl. No. 11/166,893, dated Jun. 30, 2010, 4 pages.
Fish & Richardson, P.C., Amendment in Reply to Action dated Mar. 25, 2010 in U.S. Appl. No. 11/166,893, filed on Jun. 28, 2010, 19 pages.
USPTO Final Office Action in U.S. Appl. No. 11/305,286, dated Jun. 24, 2010, 39 pages.
Response filed Aug. 9, 2010 to GB Examination Report for Application No. 0811839.0, dated Jun. 3, 2010, 10 pages.
Response filed Aug. 2, 2010 to Chinese office action for Chinese application No. 200580024230.0 dated May 17, 2010, 41 pages.
USPTO Final Office Action in U.S. Appl. No. 11/303,773, dated Aug. 18, 2010, 12 pages.
Fish & Richardson, P.C., Amendment in Reply to Action dated Mar. 30, 2010 in U.S. Appl. No. 11/402,744, filed on Aug. 30, 2010, 12 pages.
Notice of Allowance in U.S. Appl. No. 11/303,774, dated Aug. 31, 2010, 2 pages.
USPTO Office Action in U.S. Appl. No. 11/166,893, dated Sep. 2, 2010, 31 pages.
Fish & Richardson, P.C., Supplemental Amendment in Reply to Action dated Jun. 18, 2010 in U.S. Appl. No. 11/640,619, filed on Oct. 18, 2010, 20 pages.
USPTO Final Office Action in U.S. Appl. No. 11/167,785, dated Oct. 15, 2010, 10 pages.
USPTO Supplemental Notice of Allowance in U.S. Appl. No. 09/891,103, dated Oct. 15, 2010, 4 pages.
Fish & Richardson, P.C., Amendment in Reply to Action dated Jun. 24, 2010 in U.S. Appl. No. 11/305,286, filed on Oct. 25, 2010, 31 pages.
USPTO Final Office Action in U.S. Appl. No. 11/402,744, dated Nov. 12, 2010, 22 pages.
Supplemental Notice of Allowability in U.S. Appl. No. 11/303,774, dated Nov. 22, 2010, 9 pages.
Notice of Allowance in U.S. Appl. No. 11/303,774, dated Dec. 21, 2010, 8 pages.
Examiner Interview Summary in U.S. Appl. No. 11/166,893, dated Dec. 17, 2010, 3 pages.
Final Office Action in U.S. Appl. No. 11/640,619, dated Jan. 7, 2011, 24 pages.
Notice of Allowance in U.S. Appl. No. 11/037,896, dated Jan. 5, 2011, 5 pages.
Notice of Allowance in U.S. Appl. No. 11/303,773, dated Dec. 30, 2010, 9 pages.
Fish & Richardson, P.C., Amendment in Reply to Final Office Action dated Nov. 12, 2010 in U.S. Appl. No. 11/402,744, filed on Feb. 14, 2011, 12 pages.
Japanese Office action of application No. 2007-527408 issued Nov. 24, 2010, mailed Nov. 29, 2010 with English translation (21 pages).
Fish & Richardson, P.C., Amendment in Reply to Office Action dated Sep. 2, 2010 in U.S. Appl. No. 11/166,893, filed on Jan. 3, 2011, 18 pages.
USPTO Notice of Allowance in U.S. Appl. No. 11/166,893, dated Mar. 18, 2011, 21 pages.
USPTO Supplemental Notice of Allowance in U.S. Appl. No. 09/891,103, dated Mar. 14, 2011, 6 pages.
USPTO Non-Final Office Action in U.S. Appl. No. 11/402,744, dated Apr. 1, 2011, 14 pages.
Notice of Allowance in U.S. Appl. No. 11/303,774, dated Apr. 4, 2011, 7 pages.
Notice of Allowance in U.S. Appl. No. 11/303,773, dated Apr. 15, 2011, 6 pages.
USPTO Supplemental Notice of Allowance in U.S. Appl. No. 11/166,893, dated Apr. 22, 2011, 17 pages.
International Preliminary Report on Patentability for PCT international application No. PCT/US2006/047524, mailed Apr. 28, 2011 (8 pages).
Notice of Allowance in U.S. Appl. No. 11/037,896, dated May 17, 2011, 8 pages.
Response filed May 30, 2011 to Japanese Office action issued in application No. 2007-527408, Nov. 24, 2010, mailed Nov. 29, 2010 (31 pages).
USPTO Final Office Action in U.S. Appl. No. 11/402,744, dated Oct. 6, 2011, 14 pages.

* cited by examiner

Naming convention:
* $01_3$ = sector S3 with Rev-0 capable radio node operating on carrier C1
* $a2_4$ = sector S4 with Rev-A capable radio node operating on carrier C2

FIG. 3

DYNAMIC MODIFICATION OF ROUTE UPDATE PROTOCOLS

BACKGROUND

This description relates to dynamic modification of route update protocols.

High Data Rate (HDR) is an emerging mobile wireless access technology that enables personal broadband Internet services to be accessed anywhere, anytime (see P. Bender, et al., "CDMA/HDR: A Bandwidth-Efficient High-Speed Wireless Data Service for Nomadic Users", IEEE Communications Magazine, July 2000, and 3GPP2, "Draft Baseline Text for 1×EV-DO," Aug. 21, 2000). Developed by Qualcomm, HDR is an air interface optimized for Internet Protocol (IP) packet data services that can deliver a shared forward link transmission rate of up to 2.46 Mbit/s per sector using only (1×) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TIA/EIA/TSB-115, "Wireless IP Architecture Based on IETF Protocols," Jun. 6, 2000, and TIA/EIA/IS-835, "Wireless IP Network Standard," 3rd Generation Partnership Project 2 (3GPP2), Version 1.0, Jul. 14, 2000), HDR networks can be built entirely on IP technologies, all the way from the mobile Access Terminal (AT) to the global Internet, thus taking advantage of the scalability, redundancy and low-cost of IP networks.

An EVolution of the current 1×RTT standard for high-speed data-only (DO) services, also known as the 1×EV-DO protocol has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, and is also incorporated herein by reference.

Figure 1:
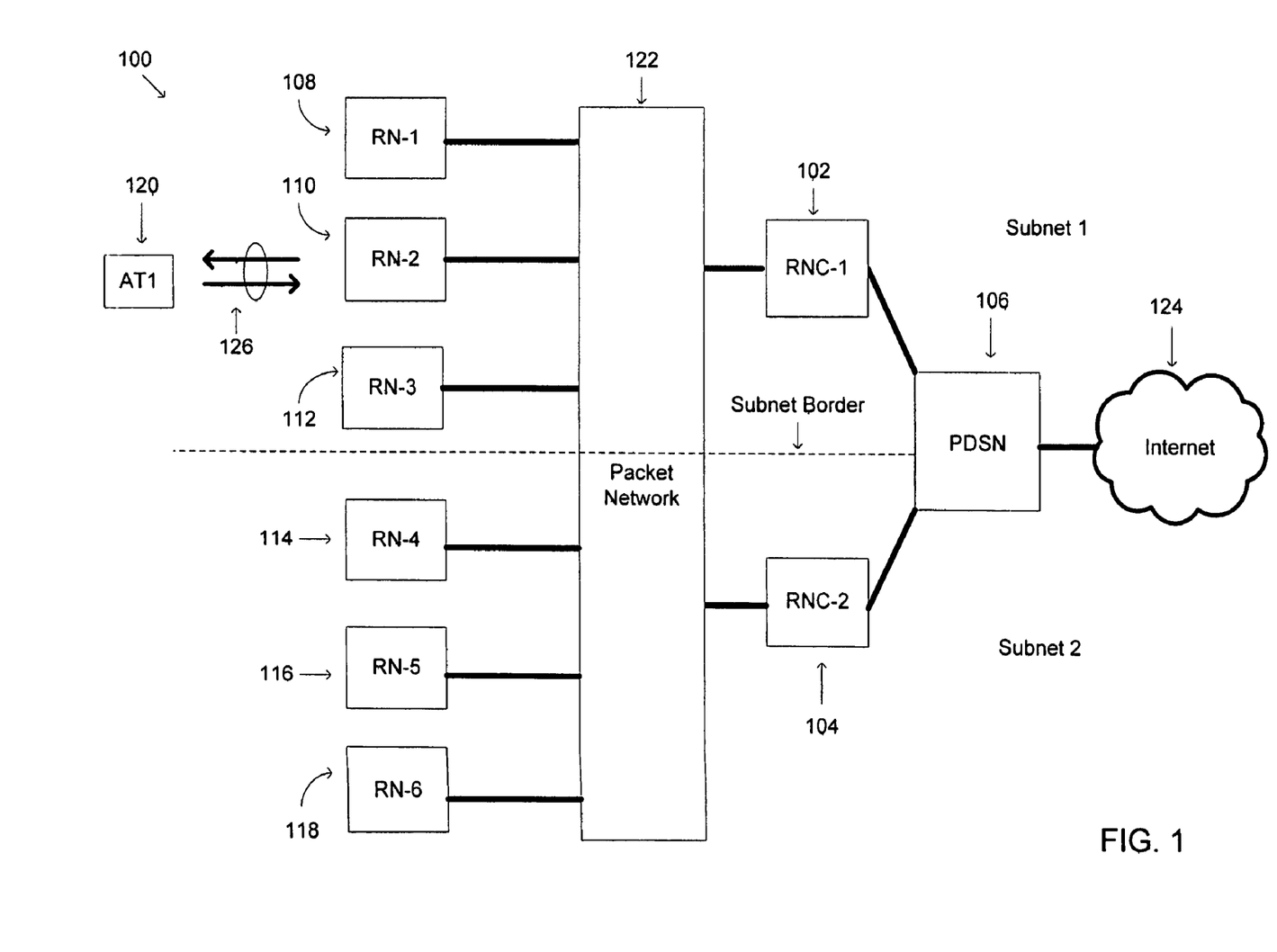
FIG. 1 shows a radio access network.

FIG. 1 shows a 1×EV-DO radio access network 100 with radio node controllers 102 and 104 connected to radio nodes 108, 110, 112, 114, 116, 118 over a packet network 122. The packet network 122 can be implemented as an IP-based network that supports many-to-many connectivity between the radio nodes and the radio node controllers. The packet network is connected to the Internet 124 via a packet data serving node (PDSN) 106. Other radio nodes, radio node controllers, and packet networks (not shown in FIG. 1) can be included in the radio access network. The packet network 122 may be several distinct networks connecting individual radio node controllers to their associated radio nodes, or it may be a single network as shown in FIG. 1, or a combination.

Typically, each radio node controller controls 25-100 radio nodes and each radio node supports 1-4 carrier frequencies each of 1.25 MHz of bandwidth. A carrier frequency (also referred to as a "carrier") is a band of radio spectrum used to establish airlinks with access terminals. The geographic area of the radio access network that is served by any given radio node is referred to as a cell. Each cell can be divided into multiple sectors (typically 3 or 6) by using multiple sectorized antennas (the term "sector" is used both conventionally and in this document, however, even when there is only one sector per cell).

Access terminals (e.g., AT1 120) communicate with the network 100 over airlinks 126. Each access terminal may be a laptop computer, a Personal Digital Assistant (PDA), a dual-mode voice/data handset, or another device, with built-in 1×EV-DO Rev-0 or Rev-A support. The airlink 126 between the network 100 and AT1 120 includes forward and reverse traffic channels, a control channel, and an access channel. A serving radio node controller (i.e., the radio node controller on which a 1×EV-DO session of the access terminal 120 resides) transmits messages and parameters that AT1 120 may need for access and paging operations over a control channel. The messages and parameters convey system parameters, access parameters, neighbor lists, paging messages, and channel assignment information to AT1 120. Access terminals (e.g., AT1 120) periodically send messages to the network 100 over the access channel. Such messages include route update messages, each of which identifies the sectors that are "visible" to the access terminal at a particular time and the pilot strength of each visible sector.

SUMMARY

In general, in one aspect, the invention features a method including enabling a radio access network to dynamically modify a route update protocol of an access terminal in an active state that is in communication with the network.

Implementations of the invention may include one or more of the following. The method further includes determining whether the access terminal is approaching a handoff boundary, and taking an action to modify the route update protocol of the access terminal based on the determining. The handoff boundary may be a carrier boundary, a revision boundary, and/or a subnet boundary.

The method includes receiving information about pilot signals detected by the access terminal, wherein the pilot signals comprise one or more of the following: a pilot signal corresponding to a sector of a candidate set of the access terminal, and a pilot signal corresponding to a sector of an active set of the access terminal. The method includes examining the received information to determine whether the access terminal is approaching a handoff boundary. The method further includes examining the received information to determine how network resources are to be allocated.

The method includes sending a message to the access terminal to cause the route update protocol of the access terminal to be modified. The message may include one of the following: an inter-revision set of route update parameters, an inter-frequency set of route update parameters, an RF dragging prevention set of route update parameters, a selective resource allocation set of route update parameters and a default set of route update parameters. The method may further include re-sending the message to the access terminal until the network receives an indication that the route update protocol of the access terminal has been modified.

The method includes dynamically modifying the route update protocol of the access terminal such that a route update message is reported by the access terminal as soon as a condition for an inter-revision hard handoff is satisfied.

The method includes dynamically modifying the route update protocol such that a route update message is reported by the access terminal as soon as a condition for an inter-frequency hard handoff is satisfied.

The method includes dynamically modifying the route update protocol such that a route update message is reported by the access terminal as soon as a condition for an RF dragging prevention is satisfied.

The method includes dynamically modifying the route update protocol such that a route update message is reported by the access terminal as soon as a condition for a selective resource allocation is satisfied.

The method includes selectively allocating resources of the network to pilots whose respective signal strength exceeds a first threshold value, and/or selectively de-allocating resources of network for pilots whose respective signal strength drops below a second threshold value. The method includes dynamically selecting one or more of the first threshold value and the second threshold value based on network loading conditions.

In general, in another aspect, the invention features a method including, at an access terminal in an active state that is in communication with a radio access network, modifying a route update protocol in response to a message received from network.

Implementations of the invention may include one or more of the following. The method includes detecting pilot signals at the access terminal, at least one of the pilot signals corresponding to a sector of a candidate set of the access terminal, and at least one of the pilot signals corresponding to a sector of an active set of the access terminal.

The method includes measuring strengths of detected pilot signals at the access terminal, comparing each detected pilot signal strength corresponding to a sector of a candidate set with a weakest detected pilot signal strength corresponding to a sector of an active set, and taking an action based on the comparing. Taking an action includes reporting a route update message to the network if a detected pilot signal strength corresponding to a sector of the candidate set exceeds the weakest detected pilot signal strength corresponding to a sector of the active set by a predetermined margin.

The method includes measuring strengths of detected pilot signals at the access terminal, determining whether a detected pilot signal strength corresponding to a sector of an active set drops below a predetermined signal strength threshold for a predetermined time period, and taking an action based on the determining. Taking an action includes reporting a route update message to the network, wherein the route update message including the most-recently detected pilot signals corresponding to respective sectors of the active set.

The method of modifying the route update protocol includes modifying one or more of the following: a PilotCompare parameter, a PilotDrop parameter, a PilotDropTimer parameter, and a PilotAdd parameter in accordance with the IS-856 specification. The PilotDrop parameter may be modified from a default value to a sector-specific value. The PilotCompare parameter may be modified from a first value to a second value, the first value being different from the second value.

Upon modification of the route update protocol, the access terminal may report a route update message as soon a sa condition for an inter-revision hard handoff is satisfied.

Upon modification of the route update protocol, the access terminal may report a route update message as soon as a condition for an inter-frequency hard handoff is satisfied.

Upon modification of the route update protocol, the access terminal may report a route update message as soon as a condition for RF dragging prevention is satisfied.

Upon modification of the route update protocol, the access terminal may report a route update message as soon as a condition for selective resource allocation is satisfied.

Other general aspects include other combinations of the aspects and features described above and other aspects and features expressed as methods, apparatus, systems, computer program products, and in other ways.

Advantages of particular implementations include one or more of the following. The techniques enable a radio access network to coerce an access terminal in communication with the network into reporting a route update message as soon as certain desired conditions are satisfied by the access terminal. Receipt of a route update message from an access terminal as soon as the conditions of a hard handoff are satisfied enables the access network to trigger an inter-revision hard handoff or an inter-frequency hard handoff in a timely fashion. This results in better overall system performance, better user experience, and fewer dropped calls. Efficient and timely triggering of hard handoffs, without having to rely on periodic route update request messages being sent by the network to the terminal, reduces the drain on system and airlink resources as unnecessary message exchange between the network and terminal may be eliminated.

Receipt of a route update message from an access terminal as soon as the conditions of RF dragging prevention are satisfied enables the access network to take appropriate actions in a timely fashion. This helps improve the quality of service provided to the access terminal, as it can be moved to the other subnet preventing RF dragging and enabling better usage of network resources. Further, this also helps reduce the interference that such an access terminal would cause to the rest of the users of that sector, improve their performance as well.

Receipt of a route update message from an access terminal as soon as the conditions of selective resource allocation are satisfied enables the access network to appropriately allocate or release resources for the access terminal in a timely fashion. This helps in better utilization of available resources, especially in a loaded system, making it to possible to support larger number of users at a better quality of service.

Other features and advantages will become apparent from the description and the claims.

DETAILED DESCRIPTION

A radio access network may implement techniques for coercing an access terminal to report a route update message as soon as certain desired conditions are satisfied. In the description to follow, the techniques are implemented by the network in four example scenarios, namely an inter-revision hard handoff scenario, an inter-frequency hard handoff scenario, an RF dragging scenario, and a selective resource allocation scenario.

Inter-Revision Hard Handoff

Figure 2:
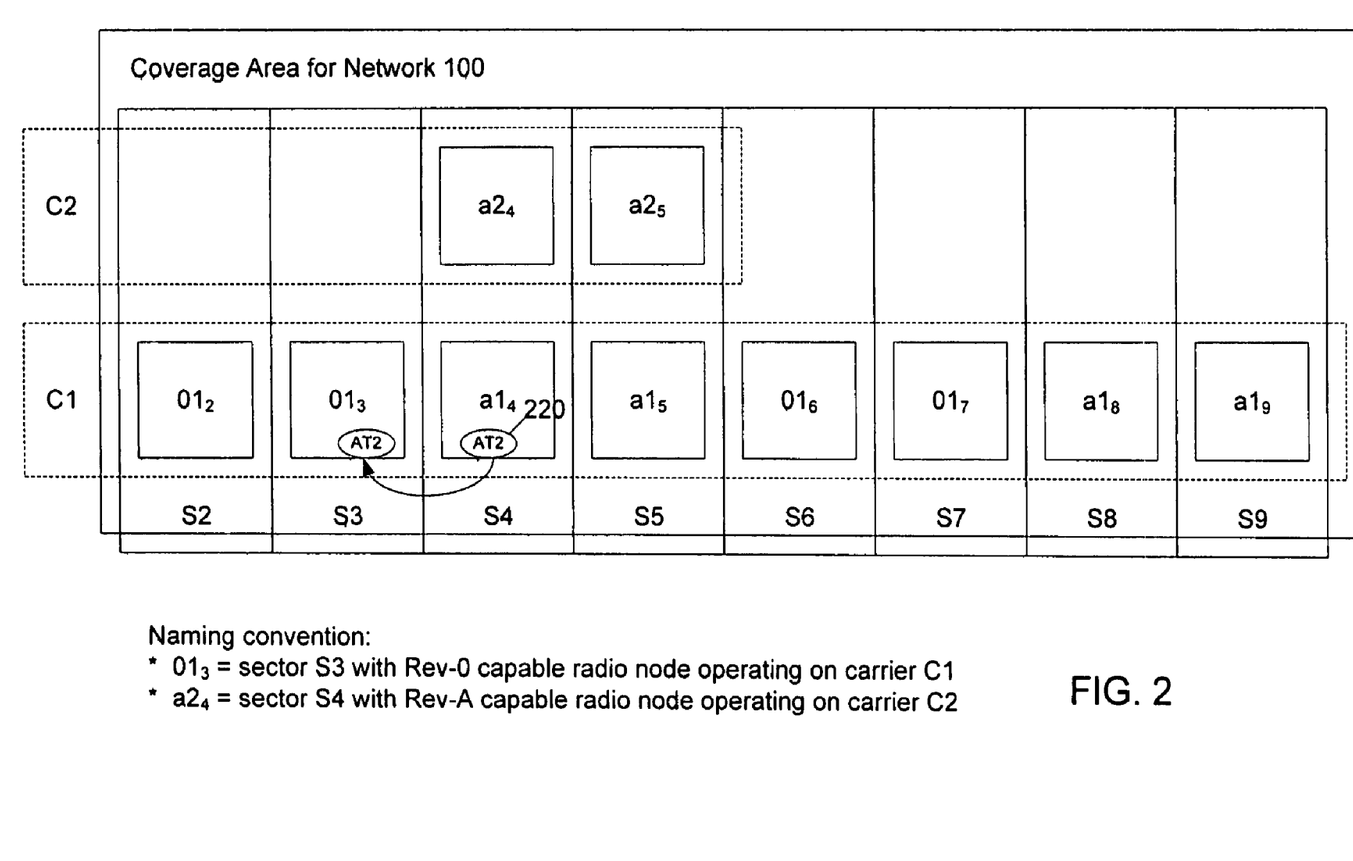
FIGS. 2-3 each show a network coverage area.

In some examples, the radio node controllers of the 1×EV-DO network 100 of FIG. 1 support multi-carrier, multi-revision sectors. FIG. 2 shows a network coverage area with two carriers C1 and C2, where C1 operates in the sectors S2-S9, and C2 operates in the sectors S4 and S5. In the illustrated example of FIG. 2, the sectors S4, S5, S8, and S9 are served by Rev-A capable radio nodes, and the sectors S2, S3, S6, and S7 are served by Rev-0 capable radio nodes. Specifically, sectors S2 and S3 are served by Rev-0 capable RN-2, sectors S4 and S5 are served by Rev-A capable RN-3, sectors S6 and S7 are served by Rev-0 capable RN-4, and sectors S8 and S9 are served by Rev-A capable RN-5. As 1×EvDO Rev-A is backwards compatible with 1×EvDO Rev-0, Rev-A capable access terminals can operate in either Rev-0 mode or Rev-A mode, depending on whether its serving radio node is Rev-0 or Rev-A capable.

During session configuration, an access terminal AT2 220 (e.g., a Rev-A capable access terminal operating in Rev-A mode) is configured with a default set of route update parameters. In the 1×EV-DO context, the route update parameters includes SetManagementSameChannel parameters having values in a number of fields specified by the IS-856 specification, such as a PilotAdd field, a PilotDrop field, a PilotCompare field, and a PilotDropTimer field. In one example, the default set of SetManagementSameChannel parameters includes a PilotCompare attribute of Z=5.

As AT2 220 in its active state moves within the coverage area of the network 100, AT2 220 periodically compares each of the detected pilot strengths in its candidate set with the weakest pilot strength included in its active set, and sends a route update message to the network 100 when AT2 220 detects a need for a change it its active set, i.e., when the margin between a candidate set pilot strength and the weakest active set pilot strength exceeds the margin of Z (e.g., Z=5) provided in the PilotCompare field. This route update message includes the most-recently detected strengths of pilots in AT2's active set and candidate set. The network 100 monitors the route update messages reported by AT2 220 to determine when an inter-revision hard handoff is to be triggered. In some examples, an inter-revision hard handoff is triggered as soon as the network 100 detects that any of the Rev-0 pilots being reported by AT2 220 are stronger than all of the Active Set Rev-A pilots being reported by AT2 220.

As AT2 220 only reports a new route update message when it detects a need for a change in its Active Set, problems may arise (e.g., in the form of dropped calls) if the route update message is received long after AT2 220 has crossed a revision border (e.g., from a1$_4$ to 01$_3$) without an inter-revision hard handoff being performed. To mitigate these problems, AT2 220 may be further configured during session configuration with an "AttributeOverrideAllowed" attribute. This "AttributeOverrideAllowed" attribute enables AT2 220 to be responsive to AttributeOverride messages sent by the network 100 to temporarily change the parameters governing AT2's route update protocol.

Suppose at time t=0, AT2 220 is in a1$_4$. The active set includes the set of pilots (specified by the pilot's PN offset and the pilot's CDMA Channel) associated with the sectors currently serving AT2 220. In one example scenario, the active set has a number of Rev-A pilots including the pilots for a1$_4$ and a1$_5$. The candidate set includes the pilots that are not in the active set, but are received by the AT2 220 with sufficient strength to indicate that the sectors transmitting them are good candidates for possible future inclusion in the active set. In some examples, the measure of "sufficient strength" is determined by comparing the strength of a pilot with the PilotAdd attribute. If the pilot strength exceeds that of the PilotAdd attribute and the pilot is not already in the active set or candidate set, the pilot is added to the candidate set. In the example scenario, the candidate set has a number of Rev-0 and Rev-A pilots including the pilots for 01$_3$ and 01$_2$.

As previously-discussed, AT2 220 periodically compares each of the detected pilot strengths in its candidate set with the weakest pilot strength included in the active set and sends a route update message to the network 100 if the margin between a candidate set pilot strength and the weakest active set pilot strength exceeds the margin of Z=5 provided in the PilotCompare field. Upon receipt of the route update message, the network 100 examines the pilots included in the route update message to determine whether AT2 220 is approaching a revision boundary, for example, moving from a1$_4$ towards 01$_3$ at time t=1. If the determination yields a negative result, no action is taken by the network 100 with regards to an inter-revision hard handoff. If, however, the determination yields a positive result, the network 100 sends an "AttributeOverride" message including an inter-revision set of SetManagementSameChannel parameters to AT2 220. This inter-revision set of SetManagementSameChannel parameters includes values in a number of fields, such as a PilotAdd field, a PilotDrop field, and a PilotCompare field. In particular, in one example, the inter-revision set of SetManagementSameChannel parameters includes a PilotCompare attribute of Z=1.

Upon receipt of the "AttributeOverride" message, AT2 220 changes the PilotCompare attribute from its default value of Z=5 to Z=1, and returns an "AttributeOverrideAcknowledge" message to the network 100. This "AttributeOverrideAcknowledge" message serves as an indicator to the network 100 that AT2 220 is now operating in accordance with a modified route update protocol in which AT2 220 is configured to send a route update message to the network 100 whenever the strength of a pilot in its candidate set exceeds that of a pilot in its active set by the PilotCompare attribute of Z=1.

In some implementations, if the network 100 does not receive an "AttributeOverrideAcknowledge" message from AT2 220 within a predetermined wait time following the sending of the "AttributeOverride" message, the network 100 is configured to repeatedly send the "AttributeOverride" message to AT2 220 in a periodic manner until an "AttributeOverrideAcknowledge" message is received. The predetermined wait time and/or the number of times the "AttributeOverride" message is re-sent to an access terminal are values configurable by the network operator.

To handle cases where the "AttributeOverrideAcknowledge" message is lost, the network may be implemented to rely on indirect indications to determine if AT2 220 has modified its SetManagementSameChannel parameters from the default set to the inter-revision set. As an example, the network 100 may examine the pilot strengths of the pilots of two route update messages received consecutively from AT2 220 to infer AT2's current route update protocol parameters.

As before, AT2 220 periodically compares each of the detected pilot strengths in its candidate set with the weakest pilot strength included in the active set. When the margin between a candidate set pilot strength and the weakest active set pilot strength exceeds the margin of Z=1 provided in the PilotCompare field, AT2 220 sends a route update message including the most-recently detected strengths of pilots in AT2's active set and candidate set to the network 100.

Upon receipt of the route update message, the network 100 examines the candidate set pilot strengths to determine whether any of the candidate set pilots are stronger than all of the active set pilots. If the determination yields a negative result, no action is taken by the network 100 with regards to an inter-revision hard handoff. If, however, the determination yields a positive result, the network 100 initiates an inter-revision hard handoff. As part of the inter-revision hard handoff, the network sends a connection close message to AT2 220. AT2 220 processes the connection close message to close its connection with the network 100, and resets the SetManagementSameChannel parameters to its default values negotiated during session configuration, including a PilotCompare attribute of Z=5. AT2 220 reverts to sending a route update message to the network 100 if the margin between a candidate set pilot strength and the weakest active set pilot strength exceeds the session configuration set value of Z=5 rather than the dynamically set value of Z=1.

In some implementations of the inter-revision hard handoff, the network 100 sends, along with the connection close message, a personality switch message and a new Traffic Channel Assignment message. These messages may be sent as separate packets or bundled together in a single packet. Once AT2 220 processes these messages, it changes its personality (e.g., from operating in Rev-A mode to operating in Rev-0 mode, or vice versa) and opens up an airlink connection with the new revision on the pilots included in the Traffic Channel Assignment message. In other implementations, the network 100 sends just the connection close message, and initiates a personality switch upon receipt of a connection request message from AT2 220.

If, upon processing the route update message from AT2 220, the network 100 determines that AT2 220 is no longer at or near the inter-revision boundary, the network 100 sends a new "AttributeOverride" message to AT2 220 to change the value of the PilotCompare attribute back to the default value of Z=5. As an example, if AT2 220 moves away from the inter-revision boundary such that the route update message only includes pilots for sectors $a1_4$ and $a1_5$, the network 100 sends a new "AttributeOverride" message to AT2 220 to reset the PilotCompare value back to the default value of Z=5.

Inter-Frequency Hard Handoff

Figure 3:
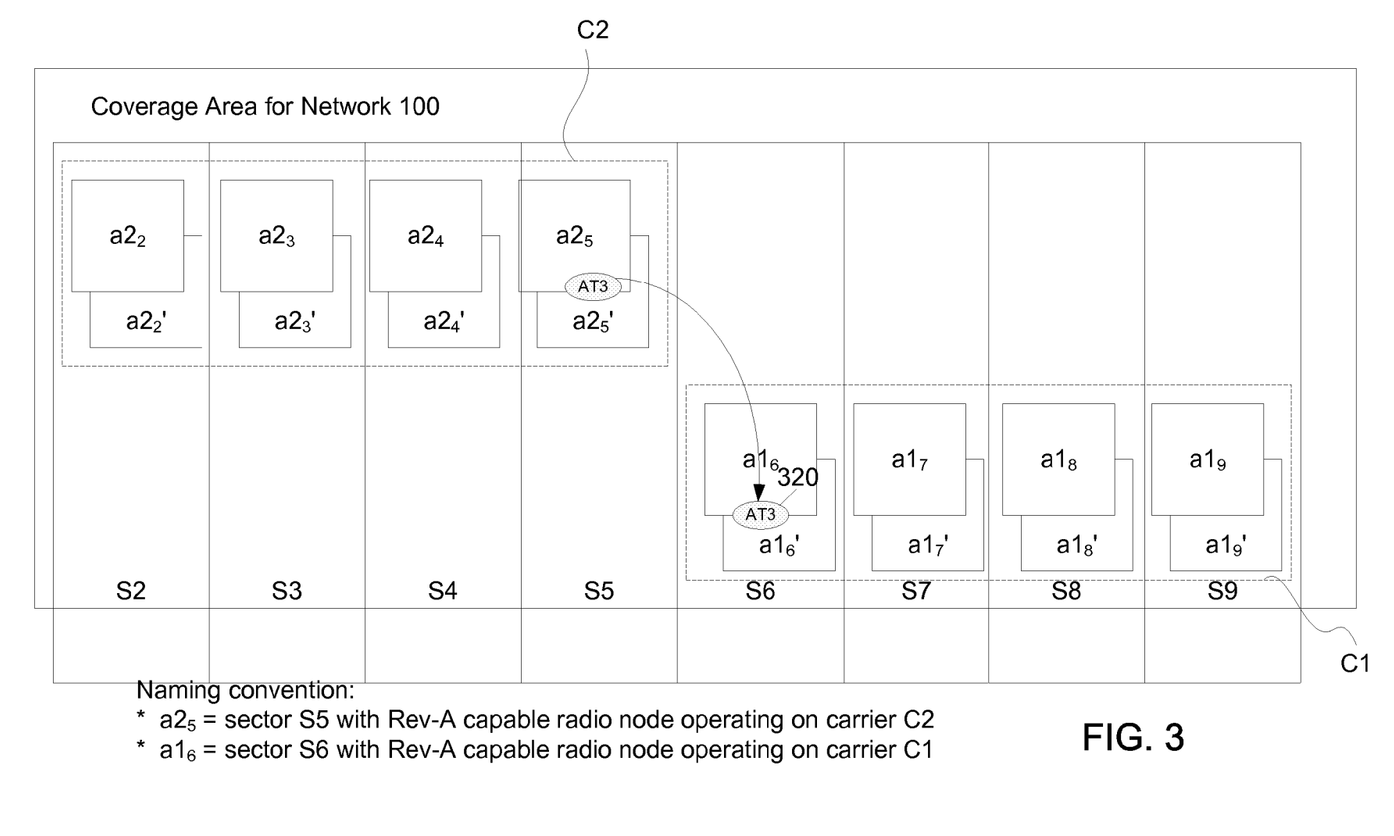

In some examples, the radio node controllers of the 1×EV-DO network 100 of FIG. 1 support multi-carrier sectors. FIG. 3 shows a network coverage area with two carriers C1 and C2, where C1 operates in the sectors S6-S9, and C2 operates in the sectors S2-S5. In the illustrated example of FIG. 3, all of the sectors S2-S9 are served by Rev-A capable radio nodes. Specifically, sectors S2 and S3 are served by RN-2, sectors S4 and S5 are served by RN-3, sectors S6 and S7 are served by RN-4, and sectors S8 and S9 are served by RN-5. Through network design, the network 100 is aware that sectors S5 and S6 are located at the boundary between carriers C1 and C2.

During session configuration, an access terminal AT3 320 (e.g., a Rev-0 or Rev-A capable access terminal) is configured with a default set of route update parameters. In the 1×EV-DO context, the route update parameters are SetManagementSameChannel parameters, e.g., a PilotDrop attribute of X=18 and a PilotDropTimer attribute of Y=3. AT3 320 in its active state is implemented to start a timer with a value equal to the PilotDropTimer attribute of Y=3 whenever the strength of any pilot in its current Active Set drops below the PilotDrop attribute of X=18. When the timer expires and the strength of the pilot is still below the value of X=18, AT3 320 reports a new route update message (with this particular pilot excluded) to the network 100.

As AT3 320 only reports a new route update message under these specific circumstances, problems may arise (e.g., in the form of dropped calls) if the route update message is received long after AT3 320 has crossed a carrier border (e.g., from $a2_5$ to $a1_6$) without an inter-frequency hard handoff being performed. To mitigate these problems, AT3 320 may be further configured during session configuration with the "AttributeOverrideAllowed" attribute. This "AttributeOverrideAllowed" attribute enables AT3 320 to be responsive to AttributeOverride messages sent by the network 100 to temporarily change the parameters governing AT3's route update protocol.

Suppose at time t=0, AT3 320 is in $a2_4$. AT3 320 periodically compares each of the detected pilot strengths for its Active Set members in its current carrier (in this case, C1) with the PilotDrop attribute of X=18. Subsequently, AT3 320 sends a route update message to the network 100 if any of the detected C1 Active Set pilot strength drops below the PilotDrop attribute of X=18 and the pilot drop timer for that pilot has expired. This route update message includes the most-recently detected strengths of C1 Active Set pilots.

Upon receipt of the route update message, the network 100 examines the C1 pilot strengths and network-estimated C1 round trip delay (RTD) measurements to determine whether AT3 320 is in a sector at or near a carrier boundary, for example, moving from $a2_4$ into $a2_5$. If the determination yields a negative result, no action is taken by the network 100 with regards to an inter-frequency hard handoff. If, however, the determination yields a positive result (for example, the route update message contains only the pilot corresponding to $a2_5$), the network 100 sends an "AttributeOverride" message including an inter-frequency set of SetManagementSameChannel parameters to AT3 320. This inter-frequency set of SetManagementSameChannel parameters includes values in a number of fields, such as a PilotAdd field, a PilotDrop field, a PilotCompare field, and a PilotDropTimer field. In particular, in one example, the inter-frequency set of SetManagementSameChannel parameters includes an $a2_5$ sector-specific PilotDrop attribute of a default value XX=16 (where XX is equal to a sector-specific SignalStrengthThreshold, which may be an operator configurable parameter depending on the radio network planning) and an $a2_5$ sector-specific PilotDropTimer attribute of YY=1.

Upon receipt of the "AttributeOverride" message, AT3 320 changes the PilotDrop attribute from its default value of X=18 to XX=16, changes the PilotDropTimer attribute from its default value of Y=3 to YY=1, and returns an "AttributeOverrideAcknowledge" message to the network 100. This "AttributeOverrideAcknowledge" message serves as an indicator to the network 100 that AT3 320 is now operating in accordance with a modified route update protocol in which AT3 320 is configured to send a route update message to the network 100 whenever the strength of any pilot in its current Active Set on carrier C1 has dropped below the $a2_5$ sector-specific PilotDrop attribute of XX=16 and has remained below XX=16 for an interval of PilotDropTimer YY=1. If the network 100 does not receive an "AttributeOverrideAcknowledge" message from AT3 320 within a predetermined wait time following the sending of the "AttributeOverride" message, the network 100 is configured to repeatedly send the "AttributeOverride" message to AT3 320 until an "AttributeOverrideAcknowledge" message is received. In some implementations, the predetermined wait time and/or the number of times the "AttributeOverride" message is resent to an access terminal are network operator configurable values.

As before, AT3 320 periodically compares each of the detected pilot strengths in its current carrier C1 with the $a2_5$ sector-specific PilotDrop attribute of XX=16. As soon as AT3 320 detects that the strength of any pilot in its current carrier C1 drops below the $a2_5$ sector-specific PilotDrop attribute of XX=16 and has remained below XX=16 for an interval of PilotDropTimer of YY=1, AT3 320 sends a route update message including the most-recently detected strengths of C1 pilots to the network 100.

Upon receipt of the route update message, the network 100 initiates an inter-frequency hard handoff by sending a Traffic Channel Assignment (TCA) message with pilots belonging to carrier C2. AT3 320 processes the TCA message and tunes to the new carrier, opening up traffic channels on carrier C2. In those instances in which the inter-frequency hard handoff is successfully performed, the network 100 also sends a new "AttributeOverride" message to reset the PilotDrop and PilotDropTimer attributes to the default values. AT3 320 upon processing the "AttributeOverride" message resets the SetManagementSameChannel parameters to its default values negotiated during session configuration, including a Pilot- Drop attribute of X=18 and a PilotDropTimer attribute of Y=3. AT3 320 reverts to sending a route update message to the network 100 whenever the strength of any pilot in its current carrier drops below the PilotDrop attribute of X=18 rather than the dynamically set value of XX=16. In those instances in which AT3 320 closes the connection while the inter-frequency hard handoff is being performed, AT3 320 automatically resets the PilotDrop and PilotDropTimer values to the default values negotiated during session configuration.

If, at any point after processing the route update message from AT3 320, the network 100 determines that AT3 320 is no longer at or near the inter-frequency boundary (e.g., then network 100 receives a new route update message from AT3 320 including only the pilot corresponding to $a2_4$), the network 100 sends a new "AttributeOverride" message to AT3 320 to change the value of the PilotDrop attribute and Pilot-DropTimer attribute back to the default values.

Referring again to FIG. 3, if AT3's active set includes pilots corresponding to multiple sectors located at the boundary between carriers C1 and C2 (e.g., pilots corresponding to $a2_5$ and $a2_5'$), various techniques may be implemented by the network 100 to select one of the sector-specific Signal-StrengthThresholds for subsequent inclusion in an "AttributeOverride" message. Examples of such techniques include: (a) selecting the maximum of the SignalStrengthThresholds configured for the pilots corresponding to $a2_5$ and $a2_5'$; (b) selecting the minimum of the SignalStrengthThresholds configured for the pilots corresponding to $a2_5$ and $a2_5'$; (c) selecting the average of the SignalStrengthThresholds configured for the pilots corresponding to $a2_5$ and $a2_5'$.

On the other hand, if AT3 320 moves along the inter-frequency boundary to a different boundary sector, from $a2_5$ to $a2_5'$, a new "Attribute Overrride" message is sent to AT3 to change the values of PilotDrop and PilotDropTimer attributes to the values specific to the new boundary sector $a2_5'$.

RF Dragging Prevention

In one example, the techniques are used to prevent RF dragging. When an active access terminal moves from one sector to another, it asks for airlinks on new sectors via route update messages. In certain cases, access terminal may be limited in its ability to receive or interpret pilot signals that are transmitted on different carriers or using different revisions than the access terminal is currently using. Likewise it may fail to recognize a pilot signal from a radio node on a different subnet than the radio node with which it is presently communicating. If the access terminal does not recognize that it could use any of the signals it is detecting, or if it fails to detect signals it could use, it may remain in communication with one radio node long after it could have established a better connection to another radio node. This condition, referred to as RF Dragging, may cause a degradation in the quality of service the user experiences, for example, a reduced rate of data transmission or an increased number of errors in transmission; in some cases, the connection may be dropped.

To mitigate the occurrence of RF dragging, the network may change an access terminal's route update protocol parameters when the access terminal approaches a subnet boundary, such that the access terminal reports a route update message when the pilot strength of the pilots in its Active Set goes below a particular threshold. Upon such occurrence, the network proactively closes the connection with the access terminal, thereby forcing the access terminal to establish a new connection with the sector it is entering. This in turn reduces or eliminates the occurrence of RF dragging and ensures that the signal quality of the connection between the network and the access terminal remains at an acceptable level.

As mentioned before, during session configuration, an access terminal AT4 is configured with a default set of route update parameters. In the 1×EV-DO context, the route update parameters are SetManagementSameChannel parameters, e.g., a PilotDrop attribute of X=18 and a PilotDropTimer attribute of Y=3. AT4 in its active state is implemented to start a timer with a value equal to the PilotDropTimer attribute of Y=3 whenever the strength of any pilot in its current Active Set drops below the PilotDrop attribute of X=18. When the timer expires and the strength of the pilot is still below the value of X=18, AT4 reports a new route update message to the network. This route update message includes the most-recently detected strengths of the pilots.

To mitigate the problem of RF Dragging, AT4 may be further configured during session configuration with the "AttributeOverrideAllowed" attribute. This "AttributeOverrideAllowed" attribute enables AT4 to be responsive to AttributeOverride messages sent by the network to temporarily change the parameters governing AT4's route update protocol.

Upon receipt of a route update message from AT4, the network examines the pilots reported in the route update message to determine if AT4 is at a subnet boundary. If the determination yields a negative result, no action is taken by the network with regards to RF Dragging Prevention. If, however, the determination yields a positive result, the network sends an "AttributeOverride" message including an RF Dragging Prevention set of SetManagementSameChannel parameters to AT4. This RF Dragging Prevention set of SetManagementSameChannel parameters includes values in a number of fields, such as a PilotAdd field, a PilotDrop field, a PilotCompare field, and a PilotDropTimer field. In particular, in one example, the RF Dragging Prevention set of SetManagementSameChannel parameters includes a sector-specific PilotDrop attribute of a default value XX=16 (where XX is equal to a sector-specific SignalStrengthThreshold, which may be an operator configurable parameter depending on the radio network planning) and a sector-specific PilotDropTimer attribute of YY=1.

Upon receipt of the "AttributeOverride" message, AT4 changes the PilotDrop attribute from its default value of X=18 to XX=16, changes the PilotDropTimer attribute from its default value of Y=3 to YY=1, and returns an "AttributeOverrideAcknowledge" message to the network. This "AttributeOverrideAcknowledge" message serves as an indicator to the network that AT4 is now operating in accordance with a modified route update protocol in which AT4 is configured to send a route update message to the network whenever the strength of any pilot in its current Active Set has dropped below the sector-specific PilotDrop attribute of XX=16 and has remained below XX=16 for an interval of PilotDropTimer YY=1. If the network does not receive an "AttributeOverrideAcknowledge" message from AT4 within a predetermined wait time following the sending of the "AttributeOverride" message, the network is configured to repeatedly send the "AttributeOverride" message to AT4 until an "AttributeOverrideAcknowledge" message is received. In some implementations, the predetermined wait time and/or the number of times the "AttributeOverride" message is resent to an access terminal are network operator configurable values.

As before, AT4 periodically compares each of the detected pilot strengths with the sector-specific PilotDrop attribute of XX=16. As soon as AT4 detects that the strength of any pilot drops below the sector-specific PilotDrop attribute of XX=16 and has remained below XX=16 for an interval of PilotDropTimer of YY=1, AT4 sends a route update message including the most-recently detected strengths of pilots to the network.

Upon receipt of the route update message indicating that AT4 is crossing the subnet boundary and the strength of the pilots in the current Active Set is below the configured threshold, the network sends a connection close message to AT4 to initiate the closing of the active airlink connection. Once the connection is closed by AT4, it may send a new connection request message which would be handled by the new (neighbor) subnet and the connection would be granted to AT4 including pilots from the new subnet, thereby preventing RF Dragging.

In the instances in which AT4 closes the connection, AT4 automatically resets the PilotDrop and PilotDropTimer values to the default values negotiated during session configuration. In the instances in which AT4 moves away from the subnet boundary back into the same subnet without crossing the subnet boundary, the network sends a new "AttributeOverride" message to reset the PilotDrop and PilotDropTimer attributes to the default values. AT4 upon processing the "AttributeOverride" message resets the SetManagementSameChannel parameters to its default values negotiated during session configuration, including a PilotDrop attribute of X=18 and a PilotDropTimer attribute of Y=3. AT4 reverts to sending a route update message to the network whenever the strength of any pilot in its current carrier drops below the PilotDrop attribute of X=18 rather than the dynamically set value of XX=16.

Selective Resource Allocation

In another example, the techniques are used for selective resource allocation and management for the access terminals in communication with the network. This may be of particular importance in loaded networks with high demand for airlink resources. In such cases, the network may decide to selectively allocate resources for only a subset of the pilots requested by the access terminal to conserve resources. This selection of the pilots may be according to a predetermined policy function as desired by the operator. For example, the network may allocate resources for the pilots whose signal strength exceeds some threshold and de-allocate resources for the pilots whose signal strength drops below another threshold value. Further, these thresholds may be chosen dynamically depending on the network loading conditions. As the network loading increases, the thresholds could be chosen more stringently so that fewer pilots are allowed in the Active Set of an access terminal in order to reduce loading. As the access terminals move, the network may proactively manage the Active Set by dynamically assigning only the pilots which satisfy the criterion. This can be effected by using the described techniques to solicit a new route update message from the access terminal whenever the selected criteria is satisfied. When a new route update message is received, the network can then send a new Traffic Channel Assignment message to the access terminal to change its Active Set to the new pilots satisfying the selected criteria.

During session configuration, an access terminal AT5 is configured with a default set of route update parameters. In the 1×EV-DO context, the route update parameters are SetManagementSameChannel parameters, e.g., a PilotDrop attribute of X=18, a PilotDropTimer attribute of Y=3 and a PilotAdd attribute of W=14. AT5 in its active state is implemented to start a timer with a value equal to the PilotDropTimer attribute of Y=3 whenever the strength of any pilot in its current Active Set drops below the PilotDrop attribute of X=18. When the timer expires and the strength of the pilot is still below the value of X=18, AT5 reports a new route update message to the network to indicate removal of the pilot from the Active Set. Similarly if the strength of a pilot in the candidate set exceeds W=14, AT5 reports a new route update message to indicate addition of this pilot in the Active Set. This route update message includes the most-recently detected strengths of the pilots.

To facilitate Selective Resource Allocation, AT5 may be further configured during session configuration with the "AttributeOverrideAllowed" attribute. This "AttributeOverrideAllowed" attribute enables AT5 to be responsive to AttributeOverride messages sent by the network to temporarily change the parameters governing AT5's route update protocol.

As load experienced by the network increases, the network sends an "AttributeOverride" message including a Selective Resource Allocation set of SetManagementSameChannel parameters to AT5. This Selective Resource Allocation set of SetManagementSameChannel parameters includes values in a number of fields, such as a PilotAdd field, a PilotDrop field, a PilotCompare field, and a PilotDropTimer field. In particular, in one example, the Selective Resource Allocation set of SetManagementSameChannel parameters includes a PilotDrop attribute of a default value XX=16 (where XX is equal to a sector-specific SignalStrengthThreshold, depending on the load on that particular sector) and a sector-specific PilotAdd attribute of WW=12. If the load increases further, these attribute values could be further changed dynamically to make the membership of the Active Set more stringent for reduced resource usage as governed by the policy function. Also, if the load decreases, the attribute values could be changed back to the previous values depending on the policy function.

Upon receipt of the "AttributeOverride" message, AT5 changes the PilotDrop attribute from its default value of X=18 to XX=16, changes the PilotAdd attribute from its default value of W=14 to WW=12, and returns an "AttributeOverrideAcknowledge" message to the network. This "AttributeOverrideAcknowledge" message serves as an indicator to the network that AT5 is now operating in accordance with a modified route update protocol in which AT5 is configured to send a route update message to the network whenever the strength of any pilot in its current Active Set has dropped below the sector-specific PilotDrop attribute of XX=16 and has remained below XX=16 for an interval of PilotDropTimer Y=3. Similarly, AT5 is configured to send a route update message to the network whenever the strength of a candidate set pilot exceeds the PilotAdd attribute of WW=12. If the network does not receive an "AttributeOverrideAcknowledge" message from AT5 within a predetermined wait time following the sending of the "AttributeOverride" message, the network is configured to repeatedly send the "AttributeOverride" message to AT5 until an "AttributeOverrideAcknowledge" message is received. In some implementations, the predetermined wait time and/or the number of times the "AttributeOverride" message is resent to an access terminal are network operator configurable values.

As before, AT5 periodically compares each of the detected pilot strengths with the sector-specific PilotDrop attribute of XX=16. As soon as AT5 detects that the strength of any pilot drops below the sector-specific PilotDrop attribute of XX=16 and has remained below XX=16 for an interval of PilotDropTimer of Y=3, AT5 sends a route update message including the most-recently detected strengths of pilots to the network.

Similarly, AT5 sends a route update message when the strength of a candidate set pilot exceeds the PilotAdd attribute of WW=12.

Upon receipt of the route update message, the network does Selective Resource Allocation for the pilots as indicated in the reported route update message. The PilotAdd, PilotDrop, PilotDropTimer and PilotCompare values could be changed dynamically depending on the network loading and requirements, as governed by the policy function. This would enable better usage of the network resources under overload conditions, and better service provided to a greater number of users.

Although the techniques described above employ the 1×EV-DO air interface standard, the techniques are also applicable to other CDMA and non-CDMA air interface technologies in which it is desired to have an access terminal send a route update message upon satisfaction of certain conditions.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

In some implementations, the functions of one or more of each of the following: a radio node, a radio node controller, and a packet data serving node, are integrated into a single physical device. References in this description to a radio access network (RAN) taking action or being acted upon generally refer to a radio node controller or a radio node controller in combination with other network components (e.g., radio node(s) and/or packet data serving node(s)).

Other embodiments are within the scope of the following claims. The following are examples for illustration only and not to limit the alternatives in any way. The techniques described herein can be performed in a different order and still achieve desirable results. In some implementations, the 1×EV-DO network 100 of FIG. 1 supports a triggering mechanism that enables the network to cause an access terminal, in communication with the network, to send an update with information about the access terminal's location. One such triggering mechanism involves the broadcasting of a cell-specific RUTriggerCode and the sending of a Modified Route Update Request message as described in U.S. application Ser. No. 11/303,774, titled "Radio Network Communication," and incorporated herein by reference. Another such triggering mechanism involves the sending of a ResetReport message.

What is claimed is:

1. A method performed in a component of a radio access network, the method comprising:
dynamically modifying a route update protocol of an access terminal operating in an active state that is in communication with the radio access network, the dynamically modifying comprising:
receiving, from the access terminal, pilot signal information detected by the access terminal; and
transmitting, to the access terminal, a message that causes an alteration in one or more threshold values used by the access terminal in determining whether to transmit a route update message to the radio access network, the message being transmitted based on the pilot signal information.

2. The method of claim 1, further comprising:
determining whether the access terminal is approaching a handoff boundary; and
taking an action to modify the route update protocol of the access terminal based on the determining.

3. The method of claim 2, wherein the handoff boundary comprises one or more of the following: a carrier boundary, a revision boundary, and a subnet boundary.

4. The method of claim 1, wherein the pilot signal information is associated with respective pilot signals, the pilot signals comprising one or more of the following: a pilot signal corresponding to a sector of a candidate set of the access terminal, and a pilot signal corresponding to a sector of an active set of the access terminal.

5. The method of claim 4, further comprising:
examining the received pilot signal information to determine whether the access terminal is approaching a handoff boundary.

6. The method of claim 4, further comprising:
examining the received pilot signal information to determine how network resources are to be allocated.

7. The method of claim 1, wherein the message causes the route update protocol of the access terminal to be modified.

8. The method of claim 7, wherein the message comprises one of the following: an inter-revision set of route update parameters, an inter-frequency set of route update parameters, an RF dragging prevention set of route update parameters, a selective resource allocation set of route update parameters, and a default set of route update parameters.

9. The method of claim 7, further comprising:
re-sending the message to the access terminal until the radio access network receives an indication that the route update protocol of the access terminal has been modified.

10. The method of claim 1, further comprising:
selectively allocating resources of the radio access network to pilots whose respective signal strength exceeds a first threshold value; and
selectively de-allocating resources of the radio access network for pilots whose respective signal strength drops below a second threshold value.

11. The method of claim 10, further comprising:
dynamically selecting one or more of the first threshold value and the second threshold value based on network loading conditions.

12. A method performed in an access terminal in communication with a radio access network, the access terminal operating in an active state within the radio access network, the method comprising:
dynamically modifying a route update protocol of the access terminal, the dynamically modifying comprising:
transmitting, to a component of the radio access network, pilot signal information detected by the access terminal; and
receiving, from the component, a message that causes an alteration in one or more threshold values used by the access terminal in determining whether to transmit a route update message to the radio access network, the message being transmitted based on the pilot signal information.

13. The method of claim 12, further comprising:
detecting pilot signals, at least one of the pilot signals corresponding to a sector of a candidate set of the access terminal, and at least one of the pilot signals corresponding to a sector of an active set of the access terminal.

14. The method of claim 12, further comprising:
measuring strengths of detected pilot signals, comparing each detected pilot signal strength corresponding to a sector of a candidate set with a weakest detected pilot signal strength corresponding to a sector of an active set, and taking an action based on the comparing.

15. The method of claim 14, wherein taking an action comprises:
reporting a route update message to the radio access network if a detected pilot signal strength corresponding to a sector of the candidate set exceeds the weakest detected pilot signal strength corresponding to a sector of the active set by a predetermined margin.

16. The method of claim 12, further comprising:
measuring strengths of detected pilot signals, determining whether a detected pilot signal strength corresponding to a sector of an active set drops below a predetermined signal strength threshold for a predetermined time period, and taking an action based on the determining.

17. The method of claim 16, wherein taking an action comprises:
reporting a route update message to the radio access network, wherein the route update message comprises pilot signals that were most recently detected by the access terminal, and that correspond to respective sectors of the active set.

18. The method of claim 12, wherein the dynamically modifying the route update protocol comprises:
modifying one or more of the following: a PilotCompare parameter, a PilotDrop parameter, a PilotDropTimer parameter, and a PilotAdd parameter in accordance with the IS-856 specification.

19. The method of claim 18, wherein the PilotDrop parameter is modified from a default value to a sector-specific value.

20. The method of claim 18, wherein the PilotCompare parameter is modified from a first value to a second value, the first value being different from the second value.

21. A non-transitory machine-readable storage medium that stores executable instructions for use at a radio node controller of a radio access network, the instructions causing a machine to:
dynamically modify a route update protocol of an access terminal operating in an active state that is in communication with the radio access network, the dynamically modifying comprising:
receiving, from the access terminal, pilot signal information detected by the access terminal; and
transmitting, to the access terminal, a message that causes an alteration in one or more threshold values used by the access terminal in determining whether to transmit a route update message to the radio access network, the message being transmitted based on the pilot signal information.

22. The machine-readable storage medium of claim 21, further comprising instructions to cause the machine to:
determine whether the access terminal is approaching a handoff boundary; and
take an action to modify the route update protocol of the access terminal based on the determination.

23. The machine-readable storage medium of claim 22, wherein the handoff boundary comprises one or more of the following: a carrier boundary, a revision boundary, and a subnet boundary.

24. The machine-readable storage medium of claim 21, wherein the pilot signal information is associated with respective pilot signals, the pilot signals comprising one or more of the following: a pilot signal corresponding to a sector of a candidate set of the access terminal, and a pilot signal corresponding to a sector of an active set of the access terminal.

25. The machine-readable storage medium of claim 24, further comprising instructions to cause the machine to:
examine the received information to determine whether the access terminal is approaching a handoff boundary.

26. The machine-readable storage medium of claim 24, further comprising instructions to cause the machine to:
examine the received information to determine how network resources are to be allocated.

27. The machine-readable storage medium of claim 21, further comprising instructions to cause the machine to:
selectively allocate resources of the radio access network to pilots whose respective signal strength exceeds a first threshold value; and
selectively de-allocate resources of the radio access network for pilots whose respective signal strength drops below a second threshold value.

28. The machine-readable storage medium of claim 27, further comprising instructions to:
dynamically select one or more of the first threshold value and the second threshold value based on network loading conditions.

29. A non-transitory machine-readable storage medium that stores executable instructions for use at an access terminal in an active state that is in communication with a radio access network, the instructions causing a machine to:

dynamically modify a route update protocol of the access terminal, the dynamically modifying comprising:
transmitting, to a component of the radio access network, pilot signal information detected by the access terminal; and
receiving, from the component, a message that causes an alteration in one or more threshold values used by the access terminal in determining whether to transmit a route update message to the radio access network, the message being transmitted based on the pilot signal information.

30. The machine-readable storage medium of claim 29, further comprising instructions to cause the machine to:
detect pilot signals, at least one of the pilot signals corresponding to a sector of a candidate set of the access terminal, and at least one of the pilot signals corresponding to a sector of an active set of the access terminal.

31. The machine-readable storage medium of claim 29, further comprising instructions to cause the machine to:
measure strengths of detected pilot signals, compare each detected pilot signal strength corresponding to a sector of a candidate set with a weakest detected pilot signal strength corresponding to a sector of an active set, and take an action based on the comparison.

32. The machine-readable storage medium of claim 31, wherein the instructions to cause the machine to take an action comprise instructions to cause the machine to:
report a route update message to the radio access network if a detected pilot signal strength corresponding to a sector of the candidate set exceeds the weakest detected pilot signal strength corresponding to a sector of the active set by a predetermined margin.

33. The machine-readable storage medium of claim 29, further comprising instructions to cause the machine to:
measure strengths of detected pilot signals, determine whether a detected pilot signal strength corresponding to a sector of an active set drops below a predetermined signal strength threshold for a predetermined time period, and take an action based on the determination.

34. The machine-readable storage medium of claim 33, wherein instructions to cause the machine to take an action comprise instructions to cause the machine to:
report a route update message to the radio access network, wherein the route update message comprises pilot signals that were most recently detected by the access terminal, and that correspond to respective sectors of the active set.

35. A component of a radio access network, the component comprising:
a processor, and
memory, including software to provide instructions to the processor to dynamically modify a route update protocol of an access terminal operating in an active state that is in communication with the radio access network, the dynamically modifying comprising:
receiving, from the access terminal, pilot signal information detected by the access terminal; and
transmitting, to the access terminal, a message that causes an alteration in one or more threshold values used by the access terminal in determining whether to transmit a route update message to the radio access network, the message being transmitted based on the pilot signal information.

36. An access terminal operating in an active state within a radio access network, the access terminal comprising:
a processor, and
memory, including software to provide instructions to the processor to dynamically modify a route update protocol of the access terminal in response to a message received from the radio access network, the dynamically modifying comprising:
transmitting, to a component of the radio access network, pilot signal information detected by the access terminal; and
receiving, from the component, a message that causes an alteration in one or more threshold values used by the access terminal in determining whether to transmit a route update message to the radio access network, the message being transmitted based on the pilot signal information.

* * * * *